(12) United States Patent
Ahouanto et al.

(10) Patent No.: US 9,937,749 B2
(45) Date of Patent: Apr. 10, 2018

(54) ADAPTER FOR ROLLING ASSEMBLY AND ROLLING ASSEMBLY COMPRISING SAME

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Michel Ahouanto, Clermont-Ferrand (FR); Luc Bestgen, Clermont-Ferrand (FR); Jacky Pineau, Clermont-Ferrand (FR); Arthur Topin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 15/304,310

(22) PCT Filed: Mar. 10, 2015

(86) PCT No.: PCT/EP2015/054954
§ 371 (c)(1),
(2) Date: Oct. 14, 2016

(87) PCT Pub. No.: WO2015/158472
PCT Pub. Date: Oct. 22, 2015

(65) Prior Publication Data
US 2017/0036483 A1 Feb. 9, 2017

(30) Foreign Application Priority Data
Apr. 16, 2014 (FR) ..................................... 14 53409

(51) Int. Cl.
*B60B 25/22* (2006.01)
*B60C 15/02* (2006.01)
(Continued)

(52) U.S. Cl.
CPC .............. *B60B 25/22* (2013.01); *B60B 23/00* (2013.01); *B60C 15/02* (2013.01); *B60B 21/02* (2013.01);
(Continued)

(58) Field of Classification Search
CPC ......... B60B 25/22; B60B 15/02; B60B 23/00; B60B 21/02; B60B 21/026;
(Continued)

(56) References Cited

U.S. PATENT DOCUMENTS

| | | | | |
|---|---|---|---|---|
| 1,250,405 A | * | 12/1917 | Williams | B60C 7/12 152/157 |
| 5,379,866 A | * | 1/1995 | Pearce | A61G 5/1027 188/17 |
| 2009/0134695 A1 | * | 5/2009 | Meggiolan | B60B 21/025 301/95.106 |

FOREIGN PATENT DOCUMENTS

| | | |
|---|---|---|
| CA | 2 281 651 | 7/1999 |
| DE | 23 58 358 | 6/1975 |

(Continued)

*Primary Examiner* — S. Joseph Morano
*Assistant Examiner* — Jean W Charleston
(74) *Attorney, Agent, or Firm* — Cozen O'Connor

(57) ABSTRACT

Adapter for a rolling assembly having an axis of rotation comprising a tire having two beads, a rim with rim well (13) between two rim seats (12) each with an axially outer end, and width W between axially outer ends of these rim seats. The adapter, coupled between each bead and each rim seat, has two axially outer ends (2) each comprising seat (3) and bearing face (4) in a plane perpendicular to the axis of rotation. Body (5) connects outer axial ends (2) and comprises a main reinforcement, face (16) in contact with each seat (12) and with well (13) and positioned radially on the inside. The adapter has a total axial width L between each
(Continued)

seat (3), and 60%≥W/L≥20%. Body (5) comprises immobilizing element (8) to wedge the adapter in the rim well (13).

15 Claims, 3 Drawing Sheets

(51) Int. Cl.
  *B60B 23/00* (2006.01)
  *B60B 21/02* (2006.01)
  *B60B 21/10* (2006.01)
(52) U.S. Cl.
  CPC ............ *B60B 21/026* (2013.01); *B60B 21/10* (2013.01); *B60B 2360/10* (2013.01); *B60B 2360/32* (2013.01); *B60B 2360/36* (2013.01); *B60B 2900/212* (2013.01); *B60B 2900/523* (2013.01)

(58) Field of Classification Search
  CPC ............ B60B 2360/32; B60B 2360/10; B60B 2900/523; B60B 2360/36; B60B 21/10; B60B 2900/212
  USPC ............ 301/95.102, 95.103, 95.105, 95.106, 301/95.107, 95.108
  See application file for complete search history.

(56) References Cited

FOREIGN PATENT DOCUMENTS

| EP | 0 633 150 | 1/1995 |
| GB | 2 039 831 | 8/1980 |
| WO | WO 00/78565 | 12/2000 |
| WO | WO 2002/068223 | 9/2002 |
| WO | WO 2013/045618 | 4/2013 |

\* cited by examiner

ADAPTER FOR ROLLING ASSEMBLY AND ROLLING ASSEMBLY COMPRISING SAME

RELATED APPLICATIONS

This is a U.S. National Phase Application under 35 USC 371 of International Application PCT/EP2015/054954 filed on Mar. 10, 2015.

This application claims the priority of French application no. 1453409 filed Apr. 16, 2014, the entire content of which is hereby incorporated by reference.

FIELD OF INVENTION

The invention relates to an adapter for a rolling assembly formed mainly of a tire and of a rim, and to a rolling assembly comprising the said adapter.

The adapter and the rolling assembly of the invention are preferably used in the field of tires for light vehicles such as passenger vehicles and vans, but may also be used for heavy vehicles, civil engineering plant tires and agricultural tires.

DEFINITIONS

A reminder of the definitions used in the present invention is given below:
"axial direction": direction parallel to the axis of rotation of the tire,
"radial direction": direction intersecting the axis of rotation of the tire and perpendicular thereto,
"radially on the inside": means of which the radial distance, measured from the axis of rotation of the tire, is closer to the axis of rotation,
"radially on the outside": means of which the radial distance, measured from the axis of rotation of the tire, is further away from the axis of rotation,
"circumferential direction": direction perpendicular to a radius and comprised in a plane perpendicular to the axis of rotation of the tire,
"radial section": section in a plane containing the axis of rotation of the tire,
"equatorial plane": plane perpendicular to the axis of rotation and which passes through the middle of the tread,
"mounted assembly": assembly comprising a tire, a steel or aluminium rim, and the adapter according to the invention.

BACKGROUND OF THE INVENTION

In application WO02/068223 it is already known practice to insert between the rim and the beads of a tire a flexible hoop section made of polymer material intended to provide the connection between each bead of the tire and the seats of the rim by means of metal flanges positioned at each end of the hoop section. Because of its elastic deformability in the radial direction in the central part, the hoop section thus makes it possible, after inflation, to maintain a maximum pressure between the rim and the hoop section.

Now, one of the difficulties in the designing of tires intended to be mounted on rigid rims is that of making them insensitive to knocks, such as potholes.

However, while such a hoop section allows the rolling assembly to tolerate deformation thereof in the radial direction, it was not designed to provide the rolling assembly with sufficient flexibility in the axial direction to guarantee it sufficient protection from knocks against a kerb or holes in the road surface.

At the very least, the inventors are seeking to find another way to form a rim that is conventional and therefore perfectly rigid, making no contribution to suspension or vertical flexibility.

Other known solutions involve strengthening the carcass ply of the tire in order to provide the tire with better protection against knocks. However, for all that, such solutions are unable to correctly reduce the intensity of the mechanical loadings experienced by the vehicle in knocks against the kerb, and they are even less able to reduce the negative consequences that such knocks have on the tires.

Document U.S. Pat. No. 1,250,405A describes a tire comprising three vulcanized zones to constitute a pneumatic casing in the form of a flattened arch, an interior support and an elastic core. That document provides no specifics regarding the ratio (rim width W)/(adapter width L).

Document WO 2013/045618A1 describes a lightweight wheel comprising a carbon-reinforced plastic rim and a wheel centre made of light metal.

Document CA2 281 651 describes a tire and a mounted assembly comprising same. The tire comprises a base for mounting on the rim and means for immobilizing the tire on the rim.

Document GB 2 039 831 describes a mounted assembly comprising a tire and a rim which comprises no removable part.

Thus, there is still a need to convert the hoop section divulged in WO02/068223 in order to give it greater capacity for vertical flexing while thus at the same time minimizing the partial, or even total, damage to its internal structure while maintaining a high level of tire road holding performance, particularly the ability of the tire to develop high cornering or drift thrust. Furthermore, at the very least, in the event of damage caused by abnormally harsh use of the tire, it is necessary to make the vehicle safe to travel over a short distance following a knock that destroys the mounted assembly.

SUMMARY OF THE INVENTION

One aspect of the invention is directed to an adapter for a rolling assembly having an axis of rotation comprising a tire having two beads, a rim having a rim well positioned between two rim seats, each one having an axially outer end, the said rim having a total width W between each axially outer end of the said two rim seats, the said adapter providing the connection between each bead and each rim seat, the said adapter having:

two axially outer ends, each one comprising an adapter seat and an adapter bearing face substantially comprised in a plane perpendicular to the axis of rotation, a body connecting the said two outer axial ends so as to form a single component and comprising at least one main reinforcement, the said adapter having a total axial width L comprised between each adapter seat, and a face intended to be in contact with each rim seat and with the rim well, and positioned radially on the inside.

In an embodiment of the invention, the adapter is characterized in that the ratio W/L is greater than or equal to 20 and less than or equal to 60%, and in that the said body comprises an immobilizing element intended to wedge the said adapter in the rim well.

The axially outer end of the adapter axially delimits a "housing intended to accept the bead of the tire". The bearing face of the axially outer end serves to support, in the axial direction, the bead of the tire in the manner of a rim flange.

Thus, the housing accommodates the tire bead in exactly the same way as the seat of a rim conventionally would. The tire is therefore axially immobilized by the inflation pressure and is pressed firmly against the bearing face of this axially outer end, in the manner of what happens conventionally in the case of the bead of a tire pressing against the rim flange of a rim.

Thus, when the rolling assembly according to an embodiment the invention is in operation and at the service loadings for which it is designed, the tire is immobilized axially with respect to the rim, more specifically the beads of the tire are immobilized axially with respect to the rim in the same was as in a conventional rolling assembly in which the beads of the tire are mounted directly on the seats of a rim, while the beads of the tire are not radially immobilized with respect to the rim, more specifically the beads of the tire are capable of moving radially to some extent with respect to the rim. In standard running, it may be said that there is practically no axial deformation of the adapter, or else that such deformation is negligible with respect to the radial deformation.

By contrast, in a knock, the axial deformation of the adapter may be great, thus contributing to reducing the stress loadings on the mounted assembly.

For preference, the ratio W/L is greater than or equal to 25 and less than or equal to 50.

The adapter according to an embodiment the invention offers the advantage of being of simple construction and of using a conventional and already-known mounting of a tire on a rim for mounting the tire on the adapter as compared with the hoop section of document WO02/068223, the mounting steps of which are different and which in particular involve a placing under depression. This adapter also offers the advantage of being able to be non-removable, unlike the device of document WO02/068223 which is only removable and which excludes the use of an additional fixing means such as a hoop.

In addition, unlike the hoop section disclosed in document WO02/068223, a connection between the adapter according to the invention and the rim well needs always to exist throughout the various steps of mounting. According to document WO02/068223, during mounting, the tire is first of all placed on the hoop section then this assembly is placed under depression, thanks to the elasticity of the hoop section, before being positioned on the rim by axial sliding and then inflated to its nominal pressure. The placing under depression during the mounting leads to the hoop section and the rim not coming into contact. As a result, in order to make it possible to keep the tire correctly on the rim at the end of mounting, the rim needs to be as wide as possible so that after inflation a maximum loading can be applied between the tire and the hoop section.

The total width W of the rim needs to be less than the total width L of the adapter so as to guarantee this adapter enough elasticity to correctly absorb the transfer of mechanical forces inherent to a knock. Such elasticity cannot be obtained when the rim width is too great.

The ratio W/L as defined in the adapter according to an embodiment the invention thus makes it possible to ensure that a mounted and inflated assembly on the one hand has a permanent and sufficient mechanical connection between the tire and the adapter and, on the other hand, correctly absorbs the mechanical forces inherent to a knock.

Another aspect of the invention is to directed to a rolling assembly consisting of a tire comprising two beads and a rim. This assembly is characterized in that comprises an adapter as defined hereinabove, the adapter providing the connection between each bead of the tire and each rim seat.

For preference, each outer axial end comprises an outer reinforcing element selected from a metal (steel), nylon, PET, aramid. It may comprise a matrix of resin and/or reinforcing fibres, such as rayon, aramid, PET, nylon, glass fibre, carbon fibre, basalt fibre, poly(ethylene 2,6-naphthalate) (PEN), polyvinyl alcohol (PVA).

The immobilizing element may have a total axial length greater than or equal to 10% and less than or equal to 80%, and preferably greater than or equal to 30% and less than or equal to 50% of the total width W of the said rim.

This immobilizing element is preferably present in the middle part of the adapter, the latter being intended to be inserted into the corresponding rim well of the rim. The immobilizing element may be made up of one or more parts which may or may not be joined together.

The immobilizing element may also be present near one of the axially outer ends or anywhere on the body positioned between the middle position of the adapter and one of the axially outer ends.

The rim well may also be arranged so that it is offset from the middle of the rim. The rim would therefore have two rim seats of different lengths.

Thus, the immobilizing element is inserted into the rim well. The well may then be positioned in any possible location on one of the two rim seats.

The immobilizing element preferably has a reinforcer with an extension modulus greater than 4 GPa, and preferably greater than 12 GPa. This reinforcer may be selected from metal (steel), nylon, polyethylene terephthalate (PET), aramid. The immobilizing element may comprise a matrix of resin and/or reinforcing fibres such as rayon, aramid, PET, nylon, glass fibre, carbon fibre, basalt fibre, poly(ethylene 2,6 naphthalate) (PEN), polyvinyl alcohol (PVA), polyketones.

The immobilizing element may be positioned at a length "l" situated between a central axis YY passing through the centre of the said immobilizing element and one of the bearing faces of the said adapter.

This length "l" is comprised between a minimum length and a maximum length which are defined by the following mathematical formulae:

$$l_{mini}=0.1(W+W/2+L)$$

and $$l_{maxi}=L-0.1(W+W/2+L)$$

in the case of use on a passenger vehicle, the rim seat will have a length at least equal to 5 mm, with $$l_{mini}=5+0.10W/2+0.1L$$

and $$l_{maxi}=L-(5+0.1W/2+0.1L)$$

The body of the adapter may comprise at least one projection. This projection may be present as desired on one axially outer end or on both. The projection is preferably made of an elastomer conventionally used in the field of tires.

The position of the projection on the adapter according to an embodiment of the invention may advantageously conform to the parametric conditions defined by the ETRTO (the European Tire and Rim Technical Organisation).

Thus, the distance "d" comprised between the centre of the projection and the bearing face of the adapter will be dependent on the total axial width L of the adapter. The table below provides a number of pairings between values of L and "d".

TABLE I

| Axial width L (inches) | Minimum "d" (mm) |
|---|---|
| 3 | 13 |
| Between 3.5 and 4 | 16 |
| ≥4.5 | 21 |

The rim seat width "A" is greater than or equal to 10% of the width W of the rim.

The width "B" between the bearing face of an axially outer end of the adapter and the axial outer end of the rim seat closest to the said bearing face is greater than or equal to 10% of the total width L of the adapter, and preferably greater than or equal to 15%. For the wheel of a passenger vehicle, this width "B" is greater than or equal to 21 mm.

The body of the adapter according to an embodiment of the invention is preferably made up of a main reinforcement formed of at least one ply of cords made of metal (steel), textile(rayon), aramid, PET, nylon, glass fibre, carbon fibre, basalt fibre, poly(ethylene 2,6-naphtalate) (PEN), polyvinyl alcohol (PVA), polyketones which are parallel to one another within the ply and radial. The ply is anchored in each axially outer end to each outer reinforcing element, such as a bead wire, to form a turnup. When the body comprises several reinforcing plies, these make angles comprised between 90° and 35° with respect to the circumferential direction. When the body comprises just one reinforcing ply, this will be oriented between 60° and 90°, more preferably at 90°, with respect to the circumferential direction.

The main reinforcement of the said body may have an extension modulus greater than or equal to 4 GPa.

The plies preferably contain the elastomeric ingredients conventionally used in the field of tires, such as rubbers that can be crosslinked by vulcanization chemical reactions by sulphur bridges, by carbon-carbon bonds created by the action of peroxides or of ionizing radiation, by other chains of specific atoms in the elastomer molecule, secondly thermoplastic elastomers (TPEs) in which the elastically deformable parts form a network between somewhat non-deformable "hard" regions, the cohesion of which is the product of physical bonds (crystallite or amorphous regions above their glass transition temperature), then non-thermoplastic elastomers and finally thermosetting resins.

The body of the adapter may comprise a hoop arranged on at least part of its radially external surface and/or at least a radially internal part of the reinforcement. The hoop used according to the invention is selected from the materials conventionally used in this function and in the field of tires, and having an extension modulus greater than or equal to 4 GPa or even greater than or equal to 12 GPa.

This hoop may or may not be secured to the adapter. If it is not secured to the adapter, it may be fitted after the adapter has been mounted on the rim.

The hoop can be cold or hot bonded to the adapter. The hoop may alternatively be secured by any mechanical means, such as by clamping or screwing.

In the event that the adapter is fixed in position before being applied to the rim, assembly between rim and adapter is then performed by force. The adapter is therefore rendered inseparable from the rim and cannot therefore be removed.

The adapter may be cold or hot bonded to the rim after a preliminary treatment, if required, of the metal of which the rim is made. When the adapter is hot or cold bonded to the rim, the adapter is irremovable.

In other instances, it may be considered to be removable.

The adapter comprises at least one removable or otherwise conducting strip positioned over all or part of the circumferential periphery of the said adapter, and over a complete path extending from the adapter bearing face to the rim J. The presence of the conducting strip also makes it possible to ensure the conduction of electricity between the ground and the wheel, and therefore between the ground and the vehicle notably when the conductivity of the elastomeric compositions is insufficient, this being all the more so when the tire rests not directly on the wheel but against an adapter.

For preference, when the conducting strip is removable or irremovable, it is positioned entirely at the radially external surface of the body.

For preference, when the conducting strip is irremovable, it is partially buried under the radially external surface of the body.

For preference, the conducting strip has an electrical resistivity less than or equal to $10^8$ Ohm·cm, and preferably less than or equal to $10^7$ Ohm·cm.

For preference, the conducting strip is made up, as desired, from a metallic leaf or from an elastomer composition containing carbon black in a quantity greater than or equal to 15%.

For preference, the carbon black in the elastomeric composition has a specific surface area greater than or equal to 500 $m^2/g$.

For preference, when the conducting strip is irremovable, it is bonded or crosslinked to the elastomeric composition of the body.

The rim may be made from a material selected from alloys of aluminium and/or of magnesium, composite materials based on carbon fibres, glass fibres, aramid fibres, plant fibres, the said fibres being comprised in a matrix based on thermosetting compounds or on thermoplastic compounds, or from a complex compound comprising an elastomer and a complex based on resin and fibres selected from carbon fibres, glass fibres, aramid fibres, plant fibres or from any combination of materials.

For preference, the fibre-based composite materials contain fibres of a length greater than or equal to 5 mm.

The matrix based on thermosetting compounds is selected from epoxy resins, vinylester, unsaturated polyesters, cyanate ester, bismaleimide, acrylic resins, phenolic resins, polyurethanes and combinations thereof.

The matrix based on thermoplastic compounds is selected from polypropylene (PP), polyethylene (PE), polyamides (PAs), semiaromatic polyamides, polyester (PET), polybutylene terephthalate (PBT), polyetheretherketone (PEEK), polyetherketoneketone (PEKK), polyethersulphone (PSU), polyetherimide (PEI), polyimide (PI), polyamideimide (PAI), polyphenylenesulphide (PPS), polyoxymethylene (POM), polyphenylene oxide (PPO).

BRIEF DESCRIPTION OF THE DRAWINGS

The invention will now be described with the support of the examples and attached figures which are given solely by way of illustration and in which.

DETAILED DESCRIPTION OF THE DRAWINGS

Figure 1:
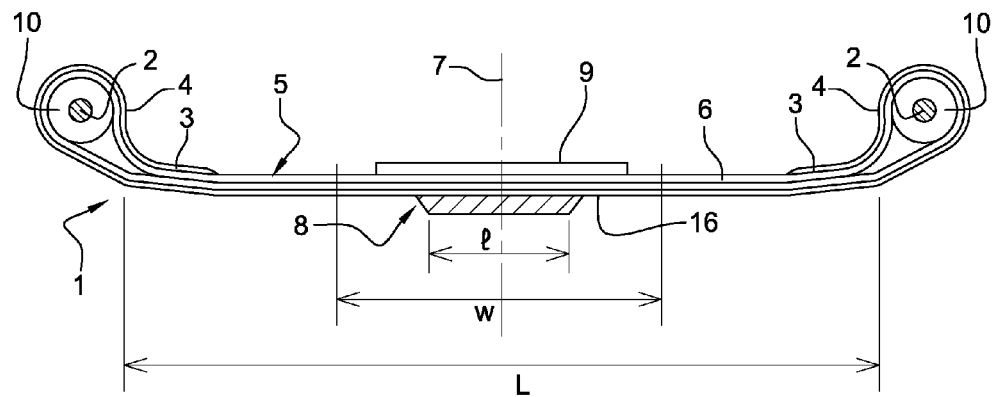
FIG. 1 is a schematic view in cross section of one embodiment of the adapter according to the invention.

As FIG. 1 shows, the adapter of general reference 1, substantially of linear shape, comprises two axially outer opposite ends 2 each one comprising an adapter seat 3 and a corresponding adapter bearing face 4 substantially comprised in a plane perpendicular to the axis of rotation of a tire. A body 5 connects the two ends 2 so as to form a one-piece component. The body comprises at least one reinforcement 6 made up of two plies containing textile reinforcers. The two plies make an angle of 45° with the circumferential direction. The adapter has a total axial width L equal to 190.5 mm measured between each bearing surface 4.

Figure 2:
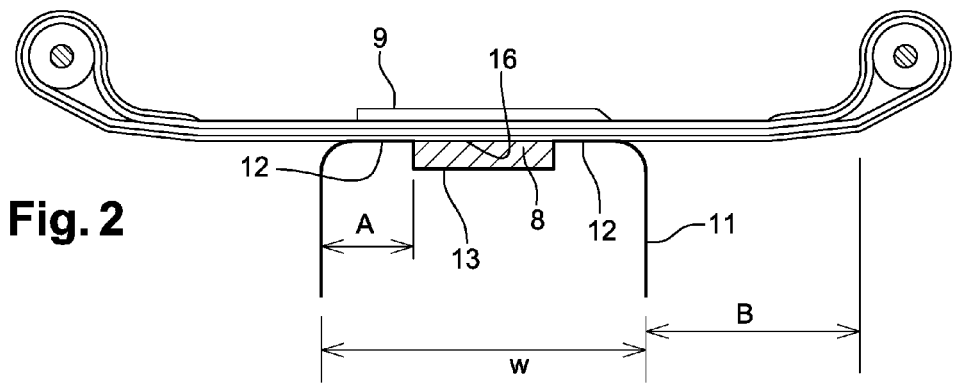
FIG. 2 is a schematic view in cross section of one embodiment of the adapter according to the invention mounted on a rim.

A face 16, that can be delimited by marks on the surface and that is situated radially on the inside of the adapter 1, is intended to be in contact with a rim well 13 and the rim seats 12 (FIG. 2).

The body 5 in its middle part (represented by an axis 7) comprises an immobilizing element 8 having a total axial length equal to 25% of the width L for a passenger vehicle wheel of width 7.5 inches, namely 190.5 mm. The immobilizing element 8 is made of rubber which has an extension modulus equal to 50 GPa.

According to this embodiment, the adapter comprises a hoop 9 positioned over at least part of the radially external surface of the body 5. The hoop is made of materials conventionally used in tires, based on textile or on metal.

The radially external ends 2 each comprise an outer reinforcing element 10, also known as a bead wire, made of a glass-resin composite material.

As FIG. 2 shows, the adapter 1 is positioned on a rim 11 depicted in part. This rim comprises two rim seats 12 separated by a rim well 13.

Figure 3:
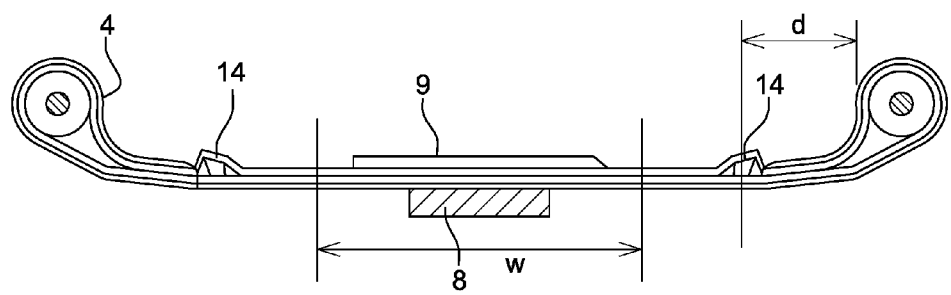
FIG. 3 depicts a schematic view in cross section of another embodiment of the adapter according to the invention.

In the embodiment of FIG. 3, the adapter comprises, in addition to the elements mentioned hereinabove, two projections 14, each one positioned on the body 5 and the centres of which are spaced apart by a distance "d" of at least 21 mm measured from the end of the bearing surface 4.

These two projections 14 are made of elastomer rubber, possibly reinforced with cords running mainly in the circumferential direction.

Figure 4:
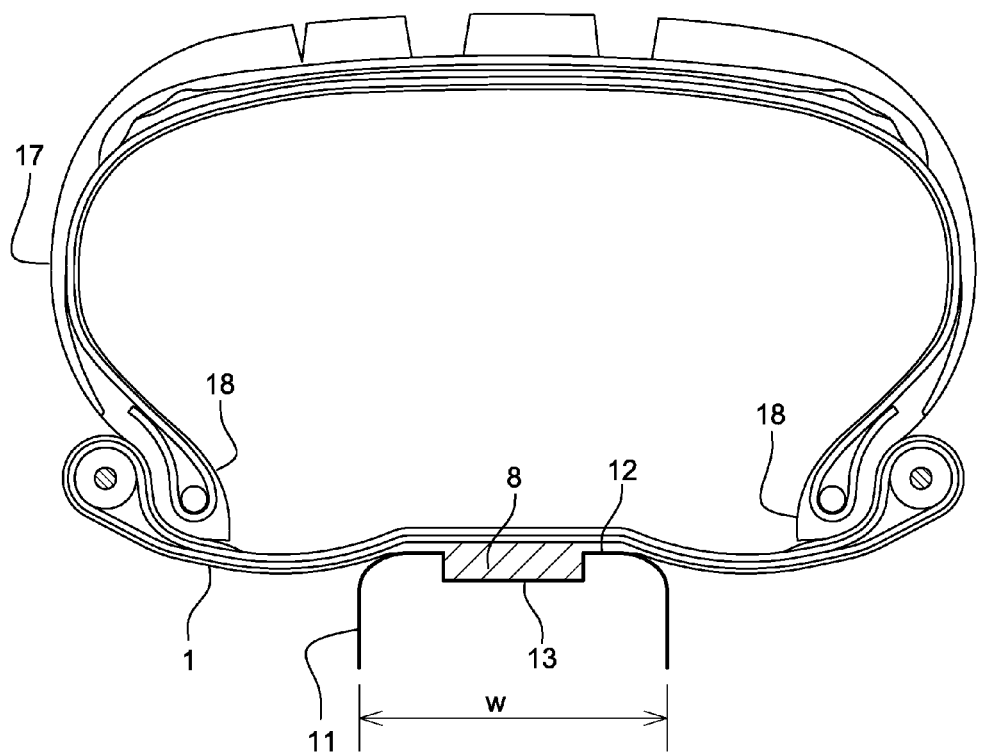
FIG. 4 depicts a schematic view in cross section of a rolling assembly comprising the adapter according to the invention, a tire and a rim according to a first embodiment.

FIG. 4 depicts a mounted assembly comprising a rim 11 of width W on which the adapter 1 is inserted and on which a conventional tire 17 is inserted via its beads 18.

This assembly is assembled in the conventional and known way by forcibly positioning the adapter on the rim in such a way that the immobilizing element 8 becomes inserted into the well 13. The beads 18 of the tire 17 are then each positioned on a seat 12 of the adapter 1. The mounted assembly is then inflated to its nominal pressure. In FIG. 4, the immobilizing element 8 is positioned in the middle part of the rim.

Figure 5:
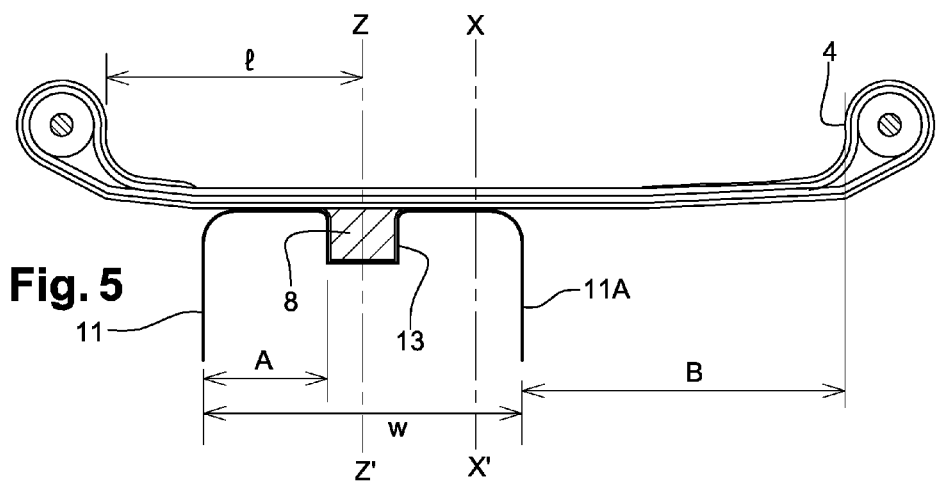
FIG. 5 depicts a schematic view in cross section of a rolling assembly comprising the adapter according to the invention, a tire and a rim according to a second embodiment.

As FIG. 5 shows, the immobilizing element 8 is positioned offset from the median axis XX' of the adapter but centrally with respect to the median axis ZZ' of the rim. It is positioned at a distance "l" greater than or equal to (W/2+21) mm in the case of a wheel of width 7.5 inches, namely 190.5 mm.

The length "l" between the centre of the rim well and the axially outer end of the adapter complies with the physical constraints A>5 mm and B>21 mm, where A is the width of a rim seat and B is the distance between the bearing face 4 of an axially outer end of the adapter and an axial end 11A of a rim seat.

Figure 6:
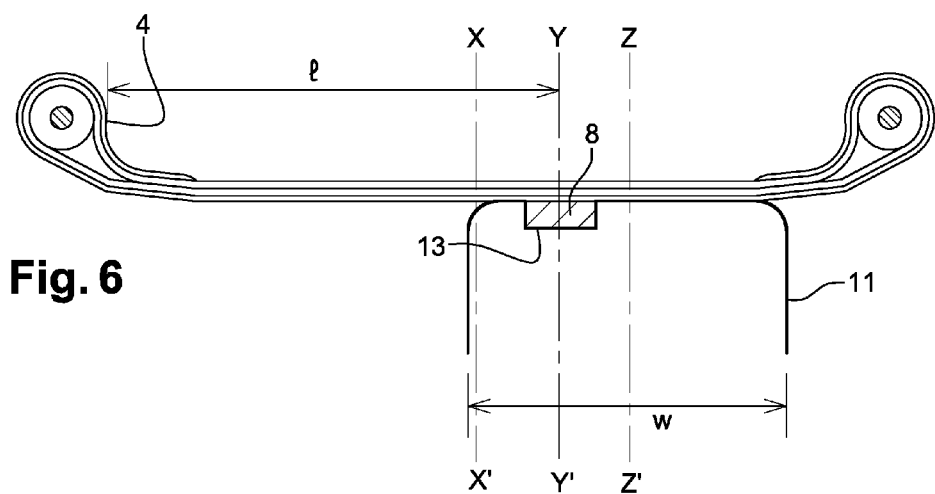
FIG. 6 depicts a schematic view in cross section of a rolling assembly comprising the adapter according to the invention, a tire and a rim according to a third embodiment.

As FIG. 6 shows, the immobilizing element 8 is positioned offset from the median axis ZZ' of the rim and with respect to the median axis XX' of the adapter. In this figure, it is positioned at a distance "l" in mm away from the centre of the axially outer end on the inboard side of the vehicle, in which $$l = L - W + 5 + W/200 - 21$$

For a passenger vehicle wheel of reference 7.5 J 17, W is equal to 50 mm, L to 190.5 mm and "l" to 56 mm.

The following examples show the results obtained with the adapter according to the invention.

EXAMPLE

Kerb Knock Tests

This test involves causing a mounted assembly to mount a kerb at an angle of attack of 30°. This choice of angle is based on the fact that it represents a loading that is very penalizing to a tire. The test is performed with two different kerb heights (90 mm and 110 mm).

The test proceeds as follows. Several passes are made with the wheel at different speeds until the tire becomes punctured. The starting speed is 20 km/h and then the speed is incremented by 5 km/h on each new pass.

A conventional assembly without an adapter (control 1) is compared against an assembly fitted with an adapter according to document WO00/78565 (control 2) and to an assembly fitted with an adapter according to the invention (invention). These assemblies are all of the size 205/55R16 comprising a 6.5J16 rim. The results are collated in Table II below and are given in percentages:

TABLE II

| | Control 1 | Control 2 | Invention |
|---|---|---|---|
| Percentage of the puncturing speed compared with control-kerb height 90 mm | 100 | >150 | >150 |
| Vertical thrust loading level (Fz) recorded at the puncturing speed | 100 | 50 | 40 |
| Condition of mounted assembly following knocks | Tire punctured Wheel marked | Tire and wheel intact Adapter plastically deformed | Tire, adapter and wheel intact |

Results greater than 100 show an improvement in behaviour when subjected to a lateral knock.

The test performed on the kerb height of 90 mm leads to the control tire puncturing at a speed of 30 km/h, whereas the assembly according to the invention suffers no damage at this same speed, or even at a speed of 50 km/h.

The test performed on the kerb height of 110 mm leads to the control tire puncturing at a speed of 20 km/h, whereas the assembly according to the invention suffers no damage at this same speed, or even at a speed of 50 km/h.

The scope of protection of the invention is not limited to the examples given herein above. The invention is embodied in each novel characteristic and each combination of characteristics, which includes every combination of any features which are stated in the claims, even if this feature or combination of features is not explicitly stated in the examples.

The invention claimed is:

1. An adapter for a rolling assembly having an axis of rotation, the rolling assembly comprising a tire having two beads, and a rim having a rim well positioned between two rim seats, each rim seat having an axially outer end, the rim having a total width W between each axially outer end of the two rim seats, the adapter comprising:
    two axially outer ends, each outer end comprising an adapter seat and an adapter bearing face, each adapter bearing face being oriented substantially in a plane perpendicular to the axis of rotation, and
    a body connecting said two axial outer ends so as to form a single component, the body comprising at least one main reinforcement layer and an immobilizing element, the body having a face adapted to be in contact with each rim seat, the immobilizing element being shaped, and positioned on the face, so as to be capable of being wedged into the rim well,
    wherein each axially outer end comprises an outer reinforcing bead wire wrapped by the at least one main reinforcement layer,
    wherein the adapter is shaped to couple the beads of the tire on the adapter seat and on the adapter bearing face, and to be mounted on the rim seats and in the rim well, and
    wherein the adapter has a total axial width L between each adapter seat so that a ratio of the total width of the rim to the total axial width of the adaptor, W/L, is greater than or equal to 20% and less than or equal to 60%.

2. The adapter of claim 1, wherein the ratio W/L is greater than or equal to 25% and less than or equal to 50%.

3. The adapter of claim 1, wherein each outer reinforcing bead wire is comprised of one of the group consisting of a metal, a composite material, a thermoplastic material, and a resin.

4. The adapter of claim 1, wherein the immobilizing element has a total axial length greater than or equal to 10% and less than or equal to 80% of the total width W of the rim.

5. The adapter of claim 1, wherein the immobilizing element comprises a reinforcer with an extension modulus greater than 4 GPa.

6. The adapter of claim 1, wherein the immobilizing element comprises a reinforcer selected from the group consisting of metal, nylon, PET, and aramid.

7. The adapter of claim 1, wherein the body comprises at least one projection positioned on a surface of the body opposite the face so as to be capable of contacting an inner surface of one bead of the tire.

8. The adapter of claim 7, wherein the projection is comprised of one of the group consisting of a metal, a composite material, a thermoplastic material, and a resin.

9. The adapter of claim 1, further comprising a planar hoop element positioned on a surface of the body opposite the face and between the two rim seats, the hoop element having an axial length equal to a distance between the two rim seats and having an extension modulus greater than or equal to 4 GPa.

10. A rolling assembly comprising:
    a tire having two beads;
    a rim having a rim well positioned between two rim seats, each rim seat having an axially outer end, the rim having a total width W between each axially outer end of the two rim seats; and
    the adapter of claim 1, the adapter being coupled between each bead of the tire and each rim seat, and the immobilizing element being wedged in the rim well.

11. The adapter of claim 1, wherein the immobilizing element has a total axial length greater than or equal to 30% and less than or equal to 50% of the total width W of the rim.

12. The adapter of claim 1, wherein the immobilizing element comprises a reinforcer with an extension modulus greater than 12 GPa.

13. The adapter of claim 1, wherein the immobilizing element is positioned offset on the face of the body so that the tire is capable of being mounted on the rim so that a median axis of the adapter is offset from a median axis of the rim.

14. The adapter of claim 13, wherein a median axis of the immobilizing element is coincident with the median axis of the rim.

15. The adapter of claim 13, wherein a median axis of the immobilizing element is offset from the median axis of the rim.

* * * * *